(12) United States Patent
Doi et al.

(10) Patent No.: US 9,664,977 B2
(45) Date of Patent: May 30, 2017

(54) ELECTROPHORETIC DISPLAY DEVICE AND METHOD OF MANUFACTURING THE SAME

(71) Applicant: TOPPAN PRINTING CO., LTD., Tokyo (JP)

(72) Inventors: Ryuji Doi, Tokyo (JP); Akira Emori, Tokyo (JP); Kayo Shoji, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 13/954,403

(22) Filed: Jul. 30, 2013

(65) Prior Publication Data

US 2013/0314764 A1 Nov. 28, 2013

Related U.S. Application Data

(63) Continuation of application No. PCT/JP2012/052745, filed on Feb. 7, 2012.

(30) Foreign Application Priority Data

Feb. 10, 2011 (JP) ................................. 2011-027015

(51) Int. Cl.
*G02B 26/00* (2006.01)
*G02F 1/167* (2006.01)
(Continued)

(52) U.S. Cl.
CPC ........ *G02F 1/167* (2013.01); *G02F 1/133516* (2013.01); *G02F 2001/133354* (2013.01)

(58) Field of Classification Search
CPC ............... G02F 1/167; G02F 1/133516; G02F 2001/133354; G02F 1/17; H01J 9/24
(Continued)

(56) References Cited

U.S. PATENT DOCUMENTS 8,884,868 B2* 11/2014 Sakamoto ...................... 345/107
2010/0157411 A1* 6/2010 Kwon ....................... G02F 1/167
359/296

(Continued)

FOREIGN PATENT DOCUMENTS

JP 50-15115 6/1975
JP 2007-322784 12/2007
(Continued)

OTHER PUBLICATIONS

International Preliminary Report on Patentability mailed Aug. 22, 2013 in corresponding International Application No. PCT/JP2012/052745.
(Continued)

*Primary Examiner* — Scott J Sugarman
*Assistant Examiner* — Mustak Choudhury

(57) ABSTRACT

Disclosed is an electrophoretic display device manufacturing method including bonding a substrate including a pixel electrode and a stacked film including a transparent electrode layer and an electrophoretic display layer, and forming a color filter layer having a pixel pattern corresponding to a pattern of the pixel electrode above a base material surface of the stacked film. The substrate has a region where the electrophoretic display layer is not arranged when the substrate and the stacked film are bonded, a pixel alignment pattern is drawn in the region, and in the forming the color filter layer, the color filter layer is formed while performing alignment using the pixel alignment pattern.

13 Claims, 5 Drawing Sheets

(51) Int. Cl.
*G02F 1/1333* (2006.01)
*G02F 1/1335* (2006.01)

(58) Field of Classification Search
USPC .......... 359/295–297, 242, 245, 253; 345/55,
345/107; 349/187; 427/162; 430/7, 32,
430/48
See application file for complete search history.

(56) References Cited

U.S. PATENT DOCUMENTS

| 2010/0225995 | A1 | 9/2010 | Paolini, Jr. et al. | |
| 2011/0026099 | A1* | 2/2011 | Kwon | G02F 1/167 |
| | | | | 359/296 |

FOREIGN PATENT DOCUMENTS

| JP | 2010-503895 | | 2/2010 |
| KR | 10-2007-0076443 | | 7/2007 |
| KR | 10-2010-0116101 | | 10/2010 |
| TW | 485266 | | 3/1984 |
| TW | 574523 | | 2/2004 |
| TW | 200832031 | | 8/2008 |
| TW | 201024887 | | 7/2010 |
| TW | 201042346 | A1 | 12/2010 |

OTHER PUBLICATIONS

International Search Report mailed Apr. 3, 2012 in corresponding International Application No. PCT/JP2012/052745.
Korean Office Action mailed Jul. 18, 2014 in corresponding Korean Patent Application No. 10-2013-7021012.
Extended European Search Report dated Jun. 10, 2014 in corresponding European Patent Application No. 12745303.3.
European Office Action dated Jun. 15, 2015 in corresponding European Patent Application No. 12745303.3.
Taiwanese Office Action mailed Sep. 12, 2014 in corresponding Taiwanese Patent Application No. 101104140.
Office Action for Taiwanese Application No. 101104140 dated Feb. 2, 2017.

* cited by examiner

ELECTROPHORETIC DISPLAY DEVICE AND METHOD OF MANUFACTURING THE SAME

CROSS REFERENCE TO RELATED APPLICATIONS

This application is a Continuation application of PCT Application No. PCT/JP2012/052745, filed Feb. 7, 2012 and based upon and claiming the benefit of priority from prior Japanese Patent Application No. 2011-027015, filed Feb. 10, 2011, the entire contents of all of which are incorporated herein by reference.

BACKGROUND OF THE INVENTION

1. Field of the Invention

The present invention relates to an electrophoretic display device and a method of manufacturing the same and, more particularly, to an electrophoretic display device that can perform multicolor display by arranging microcapsules encapsulating an electrophoretic ink between a pair of opposing electrode plates one of which is transparent and further including color filters, and a method of manufacturing the same.

2. Description of the Related Art

The recent mainstreams of information display panels are liquid crystal display panels using a backlight. However, the liquid crystal display panels place a heavy load on eyes and are therefore unsuitable to continuous long-time viewing. As a reflection-type display device that puts a little burden on the eyes, there is proposed an electrophoretic display panel including a pair of opposing electrodes and an electrophoretic display layer provided between the electrodes (Jpn. Pat. Appln. KOKOKU Publication No. 50-015115).

This electrophoretic display panel displays a character or an image by reflected light, like a printed sheet surface. For this reason, it places only a light load on the eyes and is suitable to a work of continuously viewing the screen for a long time.

This electrophoretic display panel operates by the principle that an electric field is applied to a dispersion containing charged particles dispersed, thereby moving the charged particles and displaying an image. Out of the electrophoretic display panels, a microcapsule-type electrophoretic display device that encapsulates colored charged particles in microcapsules and arranges the microcapsules between a pair of opposing electrodes is advantageous because of its low driving voltage and high flexibility. Hence, the device has been put into practical use and further developed.

Presently, the mainstream of the electrophoretic display panel is two-color display that is mainly monochrome display from the viewpoint of the structure. The two-color display microcapsule-type electrophoretic display device includes, for example, a microcapsule-type electrophoretic display layer, a transparent electrode, and a transparent base material sequentially above a pixel electrode layer of a substrate including pixel electrodes. In recent years, a color electrophoretic display device capable of performing multicolor display from the two-color display microcapsule-type electrophoretic display device has been demanded.

To make the microcapsule-type electrophoretic display device capable of displaying multicolor display, color filter layers are formed between the microcapsule-type electrophoretic display layer and the transparent electrode, between the transparent electrode and the transparent base material, or above the transparent base material.

When allowing the electrophoretic display device to perform multicolor display by providing the color filter layers, the pattern of the pixel electrodes above the substrate needs to be aligned with the pattern of the color filter layers. However, when bonding a film with the color filter layers formed thereon to the surface of the electrophoretic display device, the alignment to make the pattern of the color filter layers match the pattern of the pixel electrodes above the substrate is difficult, and the productivity lowers.

In addition, if the distance between the patterned color filter layers and the electrophoretic display layer increases, the tint becomes faint in the case of observation from an oblique direction. The electrophoretic display device thus loses its advantage of being less affected by the observation angle.

BRIEF SUMMARY OF THE INVENTION

Technical Problem

It is an object of the present invention to provide an electrophoretic display device that can increase the productivity and perform multicolor display with a little change in tint even in the case of observation from an oblique direction, and a method of manufacturing the same.

Solution to the Problems

According to a first aspect of the present invention, there is provided an electrophoretic display device manufacturing method including: preparing a substrate including a pixel electrode; preparing a stacked film including, above a transparent base material, a transparent electrode layer and an electrophoretic display layer in which microcapsules encapsulating a dispersion formed by dispersing electrophoretic particles in a dispersion medium are fixed by a binder resin sequentially from the transparent base material; bonding the substrate and the stacked film so as to join the pixel electrode and the electrophoretic display layer; and forming a color filter layer having a pixel pattern corresponding to a pattern of the pixel electrode above a base material surface of the stacked film, wherein the substrate has a region where the electrophoretic display layer is not arranged when the substrate and the stacked film are bonded, a pixel alignment pattern is drawn in the region, and in the forming the color filter layer, the color filter layer is formed while performing alignment using the pixel alignment pattern.

According to a second aspect of the present invention, there is provided an electrophoretic display device including: a substrate; a pixel electrode formed above the substrate; an electrophoretic display layer arranged above the pixel electrode and formed by fixing, by a binder resin, microcapsules encapsulating a dispersion formed by dispersing electro-migrating particles in a dispersion medium; a transparent electrode layer provided above the electrophoretic display layer; a transparent base material provided above the transparent electrode layer; and a color filter layer formed above the transparent base material, wherein the substrate has a region where the electrophoretic display layer is not arranged, and a pixel alignment pattern is drawn in the region.

DETAILED DESCRIPTION OF THE INVENTION

Figure 1A:
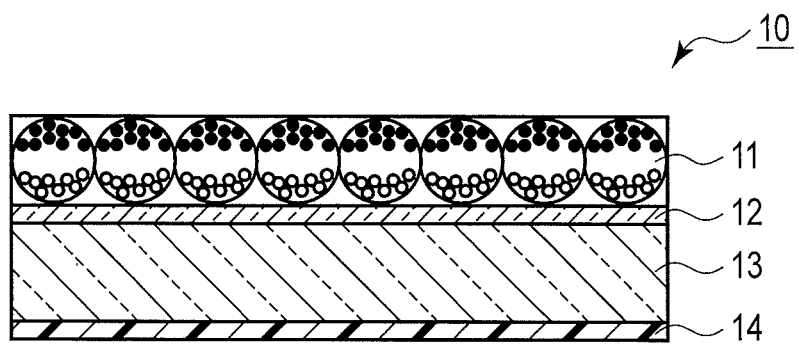
FIG. 1A is a sectional view showing a stacked film used in a method of manufacturing an electrophoretic display device according to a first embodiment of the present invention.

The embodiments of the present invention will now be described.

An electrophoretic display device manufacturing method according to an embodiment of the present invention includes preparing a substrate including a pixel electrode, preparing a stacked film including, above a transparent base material, a transparent electrode layer and an electrophoretic display layer in which microcapsules encapsulating a dispersion formed by dispersing electrophoretic particles in a dispersion medium are fixed by a binder resin sequentially from the transparent base material, bonding the substrate and the stacked film so as to join the pixel electrode and the electrophoretic display layer, and forming a color filter layer having a pixel pattern corresponding to a pattern of the pixel electrode above a base material surface of the stacked film. In this electrophoretic display device manufacturing method, the substrate has a region where the electrophoretic display layer is not arranged when the substrate and the stacked film are bonded, a pixel alignment pattern is drawn in the region, and in the forming the color filter layer, the color filter layer is formed while performing alignment using the pixel alignment pattern.

A receptor layer is formed above the base material surface of the stacked film. The forming the color filter layer above the base material surface of the stacked film may be performed by discharging an ink to the receptor layer by inkjet printing.

In the preparing the stacked film, the receptor layer can be formed above the base material surface of the stacked film. In this case, the receptor layer can be formed above the base material surface of the stacked film after the bonding the substrate and the stacked film.

The bonding the substrate and the stacked film can be performed using an adhesive by applying a pressure.

A protective film can be stacked above the color filter layer after forming the color filter layer.

A joint end between the pixel electrode and the electrophoretic display layer can be sealed by a resin after forming the color filter layer.

The thickness of the transparent base material can fall within the range of 10 μm (inclusive) to 100 μm (inclusive).

An electrophoretic display device according to another embodiment of the present invention includes a substrate, a pixel electrode formed above the substrate, an electrophoretic display layer arranged above the pixel electrode and formed by fixing, by a binder resin, microcapsules encapsulating a dispersion formed by dispersing electro-migrating particles in a dispersion medium, a transparent electrode layer provided above the electrophoretic display layer, a transparent base material provided above the transparent electrode layer, and a color filter layer formed above the transparent base material. In this electrophoretic display device, the substrate has a region where the electrophoretic display layer is not arranged, and a pixel alignment pattern is drawn in the region.

According to the above-described electrophoretic display device and the method of manufacturing the same, it is possible to increase the productivity and perform multicolor display with a little change in tint even in the case of observation from an oblique direction.

A method of manufacturing an electrophoretic display device according to the first embodiment of the present invention will be described next with reference to FIGS. 1A, 1B, 1C, 1D, and 1E.

Figure 1B:
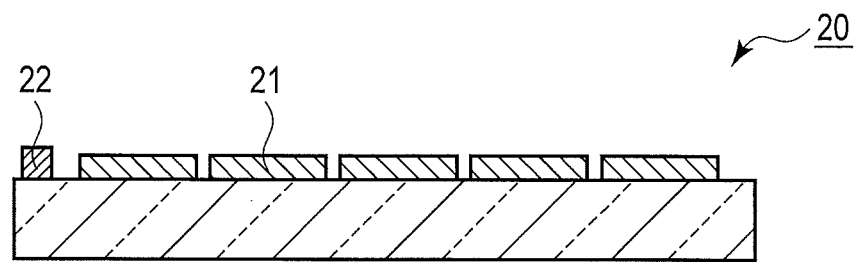
FIG. 1B is a sectional view showing a substrate used in the method of manufacturing the electrophoretic display device according to the first embodiment of the present invention.

First, as shown in FIG. 1A, a stacked film 10 is prepared. The stacked film 10 includes, above one surface of a transparent base material 13, a transparent electrode layer 12 and an electrophoretic display layer 11 in which microcapsules encapsulating a dispersion formed by dispersing electrophoretic particles in a dispersion medium are fixed by a binder resin, and a receptor layer 14 above the other surface. In addition, as shown in FIG. 1B, a substrate 20 including pixel electrodes 21 and an alignment mark 22 for pixel alignment is prepared.

Figure 1C:
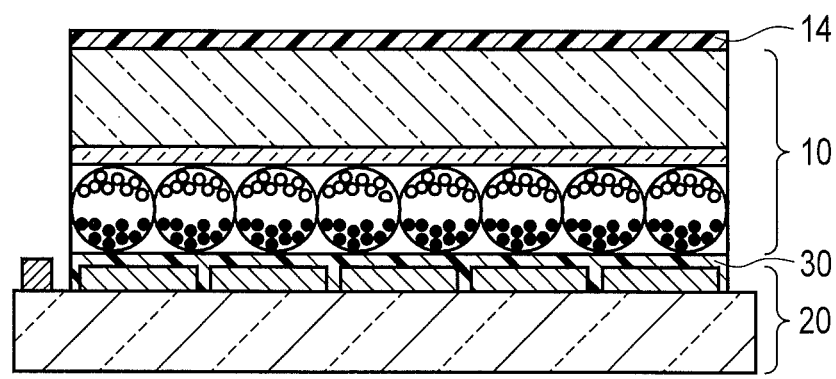
FIG. 1C is a sectional view for explaining an example of the method of manufacturing the electrophoretic display device according to the first embodiment of the present invention.

Next, as shown in FIG. 1C, the electrophoretic display layer 11 of the stacked film 10 and the pixel electrodes 21 of the substrate 20 are bonded by an adhesive layer 30. At this time, the stacked film 10 and the substrate 20 are bonded so as not to arrange the opaque electrophoretic display layer 11 above the alignment mark 22 above the substrate.

Figure 1D:
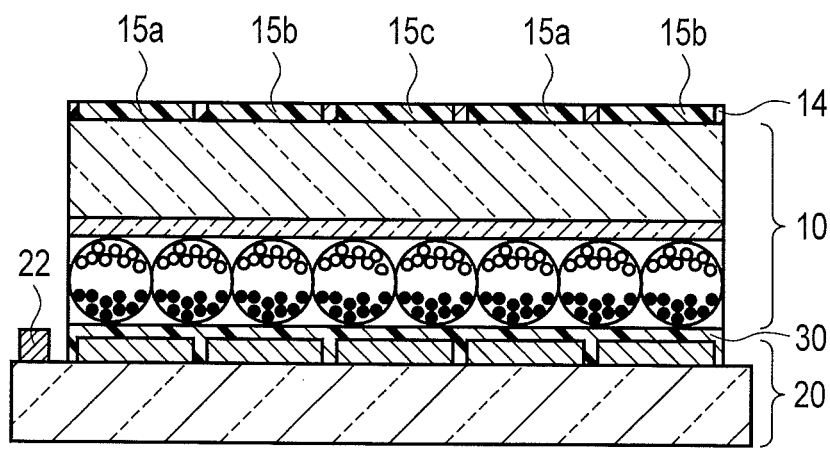
FIG. 1D is a sectional view for explaining an example of the method of manufacturing the electrophoretic display device according to the first embodiment of the present invention.

As shown in FIG. 1D, color filter layers are formed in the receptor layer 14 by discharging two or more kinds of inks to the receptor layer 14 by inkjet printing. In FIG. 1D, a red color filter layer 15a, a blue color filter layer 15b, and a green color filter layer 15c are formed. When forming the color filter layers, the pattern of the pixel electrodes 21 above the substrate 20 needs to correspond to the color filter layers 15a, 15b, and 15c. In the method of manufacturing the electrophoretic display device according to this embodiment, the stacked film 10 and the substrate 20 are bonded so as not to provide the opaque electrophoretic display layer above the alignment mark 22 above the substrate. This makes it possible to easily form the pattern of the color filter layers 15a, 15b, and 15c corresponding to the pattern of the pixel electrodes based on the alignment mark 22 above the substrate in the step of forming the color filter layers 15a, 15b, and 15c after the stacked film 10 and the substrate 20 are bonded.

Figure 1E:
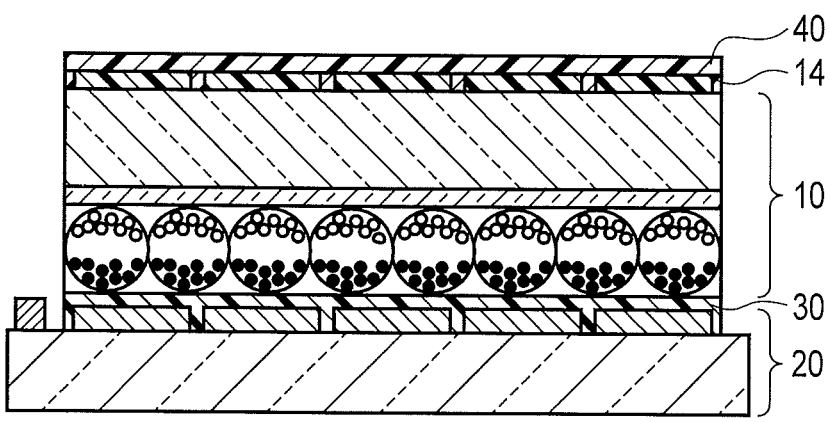
FIG. 1E is a sectional view for explaining an example of the method of manufacturing the electrophoretic display device according to the first embodiment of the present invention.

Finally, as shown in FIG. 1E, a protective film 40 is provided above the receptor layer 14 and the color filter layers 15a, 15b, and 15c, thereby manufacturing the electrophoretic display device.

A method of manufacturing an electrophoretic display device according to a second embodiment of the present invention will be described next with reference to FIGS. 2A, 2B, 2C, 2D, 2E, and 2F.

Figure 2A:
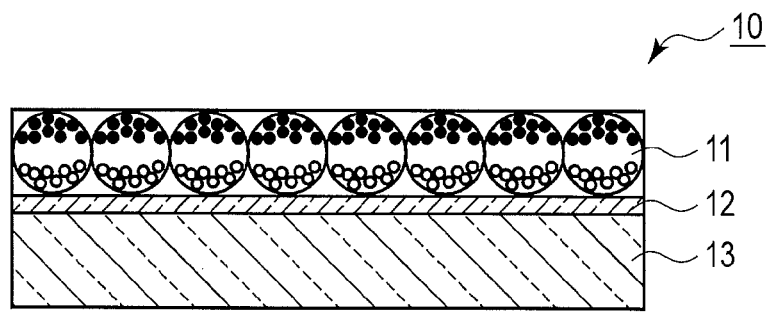
FIG. 2A is a sectional view showing a stacked film used in a method of manufacturing an electrophoretic display device according to a second embodiment of the present invention.
Figure 2B:
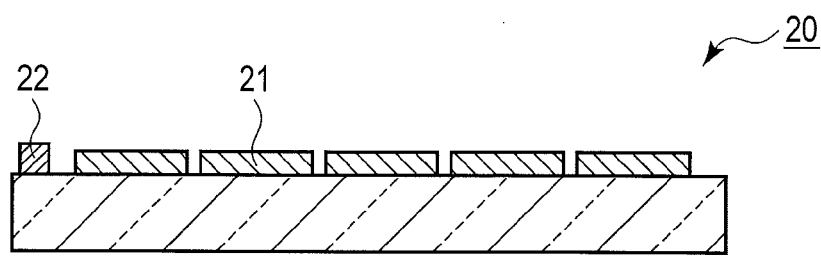
FIG. 2B is a sectional view showing a substrate used in the method of manufacturing the electrophoretic display device according to the second embodiment of the present invention.

First, as shown in FIG. 2A, a stacked film 10 is prepared. The stacked film 10 includes, above one surface of a transparent base material 13, a transparent electrode layer 12 and an electrophoretic display layer 11 in which microcapsules encapsulating a dispersion formed by dispersing electrophoretic particles in a dispersion medium are fixed by a binder resin. In addition, as shown in FIG. 2B, a substrate 20 including pixel electrodes 21 and a pattern (alignment mark) 22 for pixel alignment is prepared.

Figure 2C:
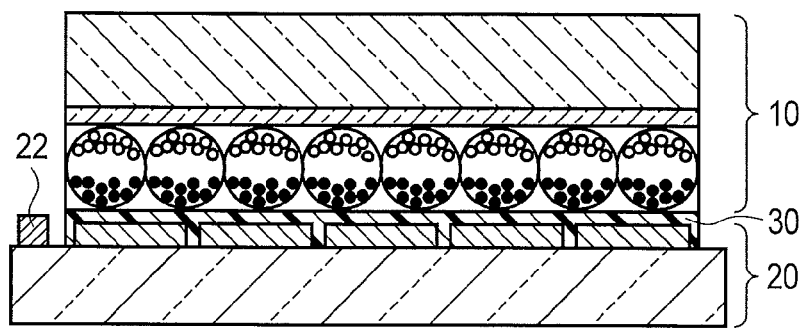
FIG. 2C is a sectional view for explaining an example of the method of manufacturing the electrophoretic display device according to the second embodiment of the present invention.

Next, as shown in FIG. 2C, the electrophoretic display layer 11 of the stacked film 10 and the pixel electrodes 21 of the substrate 20 are bonded by an adhesive layer 30. At this time, the stacked film 10 and the substrate 20 are bonded so as not to arrange the opaque electrophoretic display layer 11 above the alignment mark 22 above the substrate 20.

Figure 2D:
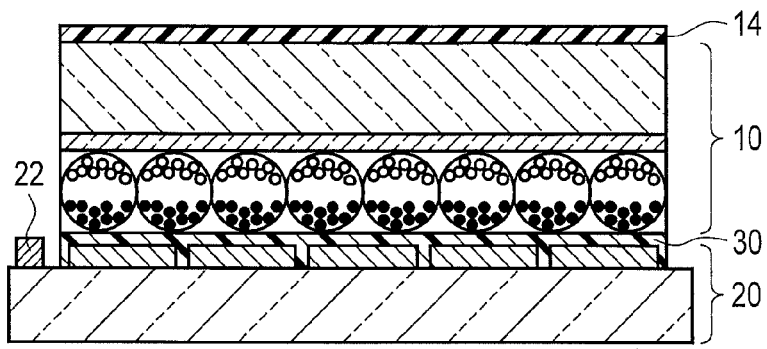
FIG. 2D is a sectional view for explaining an example of the method of manufacturing the electrophoretic display device according to the second embodiment of the present invention.

Next, as shown in FIG. 2D, a receptor layer 14 is formed above the transparent base material surface of the stacked film.

Figure 2E:
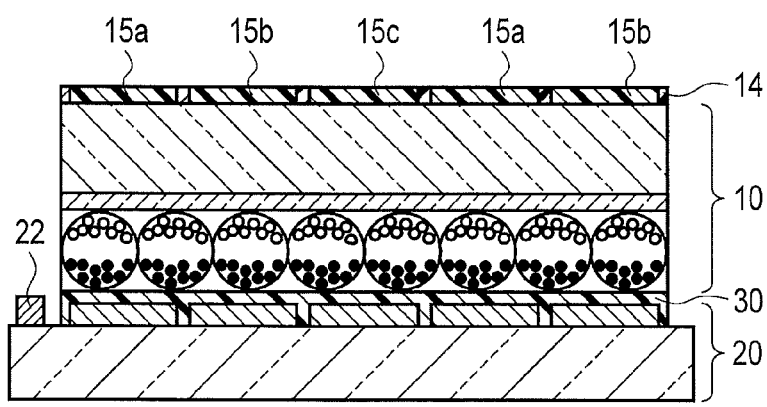
FIG. 2E is a sectional view for explaining an example of the method of manufacturing the electrophoretic display device according to the second embodiment of the present invention.

As shown in FIG. 2E, color filter layers are formed in the receptor layer 14 by discharging two or more kinds of inks to the receptor layer 14 by inkjet printing. In FIG. 2E, a red color filter layer 15a, a blue color filter layer 15b, and a green color filter layer 15c are formed. When forming the color filter layers, the pattern of the pixel electrodes 21 above the substrate 20 needs to correspond to the color filter layers 15a, 15b, and 15c. In the method of manufacturing the electrophoretic display device according to this embodiment, the stacked film 10 and the substrate 20 are bonded so as not to provide the opaque electrophoretic display layer above the alignment mark 22 above the substrate 20. This makes it possible to easily form the pattern of the color filter layers 15a, 15b, and 15c corresponding to the pattern of the pixel electrodes based on the alignment pattern above the substrate in the step of forming the color filter layers 15a, 15b, and 15c after the stacked film 10 and the substrate 20 are bonded.

Figure 2F:
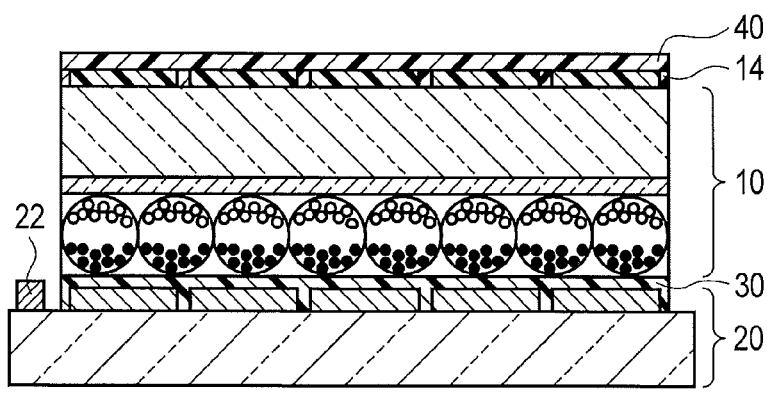
FIG. 2F is a sectional view for explaining an example of the method of manufacturing the electrophoretic display device according to the second embodiment of the present invention.

Finally, as shown in FIG. 2F, a protective film 40 is provided above the receptor layer 14 and the color filter layers 15a, 15b, and 15c, thereby manufacturing the electrophoretic display device.

Figure 3:
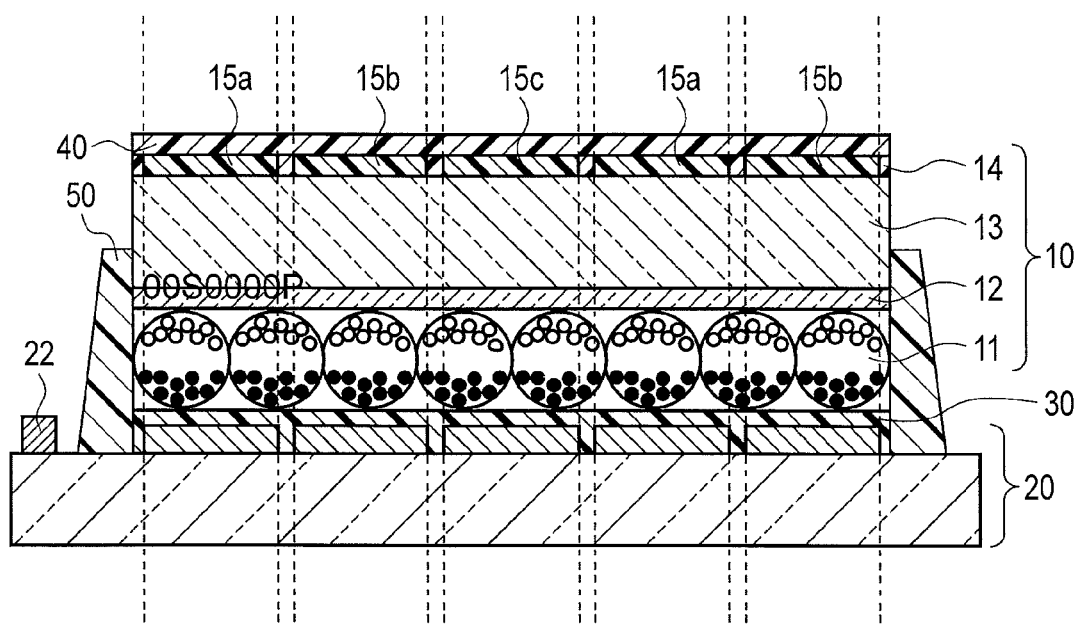
FIG. 3 is a schematic sectional view of an electrophoretic display device according to a third embodiment of the present invention.

FIG. 3 is a schematic sectional view of an electrophoretic display device according to a third embodiment of the present invention, which is manufactured by the electrophoretic display device manufacturing method according to one of the above-described first and second embodiments of the present invention.

In the electrophoretic display device shown in FIG. 3, an electrophoretic display layer 11 in which microcapsules encapsulating a dispersion formed by dispersing electrophoretic particles in a dispersion medium are fixed by a binder resin, a transparent electrode layer 12, a transparent base material 13, a receptor layer including color filter layers 15a, 15b, and 15c, and a protective film are sequentially provided above an adhesive layer 30 above a substrate 20 including pixel electrodes 21. At this time, the pattern of the pixel electrodes 21 and the color filter layers 15a, 15b, and 15c which sandwich the electrophoretic display layer are provided so as to face each other. Multicolor display (color display) can be performed by making the pattern of the pixel electrodes 21 to match the color filter layers 15a, 15b, and 15c in the stacking direction of the layers. In the electrophoretic display device shown in FIG. 3, a sealing layer 50 configured to prevent water from entering the electrophoretic display layer may be provided on the side surfaces of the electrophoretic display layer.

The operation principle of the electrophoretic display device having the above-described arrangement will be explained next.

The pixel electrodes 21 of the substrate 20 are connected to their switching elements (not shown) so as to be able to apply positive and negative voltages between the pixel electrodes and the transparent electrode layer 12. To display an image, normally, the pixel electrodes 21 are connected to a power supply having an active matrix driving circuit arrangement. When a voltage is applied to the pixel electrodes 21, the electric field applied to the microcapsule layer 11 varies. When the pixel electrodes 21 serve as positive electrodes, negatively changed particles in the microcapsules move to the side of the pixel electrodes 21 on the back side, whereas positively changed particles move to the side of the transparent electrode layer 12 on the front side. Similarly, when the pixel electrodes 21 change to negative electrodes, positively changed particles move to the side of the pixel electrodes 21, whereas negatively changed particles move to the side of the transparent electrode layer 12. Assume that setting is done to, for example, positively charge black particles and negatively charge white particles. In this case, the display color is the color of the particles moved to the side of the transparent electrode layer 12 on the front side. Hence, light from the observation side is reflected by the particle, and the reflected light passes through the colored pattern of the opposing color filter layers, thereby displaying a desired character or image in colors.

In the electrophoretic display device according to the above-described embodiment and the method of manufacturing the same, the receptor layer 14 and the color filter layers 15a, 15b, and 15c are directly formed on the transparent base material 13. Hence, only the transparent electrode layer 12 and the transparent base material 13 exist between the electrophoretic display layer 11 and the color filter layers 15a, 15b, and 15c. The transparent electrode layer 12 has a thickness on the submicron order. For this reason, the distance between the electrophoretic display layer 11 and the color filter layers 15a, 15b, and 15c is decided by the thickness of the transparent base material 13. It is therefore possible to reduce the distance by thinning the transparent base material 13 and obtain an electrophoretic display device capable of performing multicolor display with a little change in tint even at the time of observation from an oblique direction.

In the above-described embodiment, the color filter layers 15a, 15b, and 15c provided above the transparent base material 13 are preferably formed by discharging, by inkjet printing, inks of a plurality of colors to the receptor layer 14 formed above the surface of the transparent base material 13. When forming the pattern of the color filter layers 15a, 15b, and 15c above the transparent base material 13, the pattern may be formed not by inkjet printing but by photolithography or offset printing. In these methods as well, alignment based on the alignment mark 22 on the substrate 20 is performed, thereby forming, above the transparent base material 13, the color filter layers 15a, 15b, and 15c corresponding to the pixel electrodes 21.

As a characteristic feature of the electrophoretic display device manufacturing method according to the above-described embodiment, the color filter layers 15a, 15b, and 15c are formed after the stacked film 10 and the substrate 20 are bonded. Considering the handling properties of the bonded structure of the stacked film 10 and the substrate 20, the color filter layers 15a, 15b, and 15c are preferably formed by discharging inks of a plurality of colors by inkjet printing. When the color filters are formed by inkjet printing, the pattern of the pixel electrodes 21 and that of the color filter layers 15a, 15b, and 15c can be aligned more easily than in another pattern formation method.

In the electrophoretic display device according to the above-described embodiment and the method of manufacturing the same, a protective film is preferably stacked above the color filter layers 15a, 15b, and 15c. When the protective film is provided, the damage resistance of the electrophoretic display device can be improved.

In the electrophoretic display device according to the above-described embodiment and the method of manufacturing the same, the thickness of the transparent base material 13 preferably falls within the range of 10 µm (inclusive) to 100 µm (inclusive). As described above, in the above-described embodiment, the distance between the electrophoretic display layer 11 and the color filters is decided by the thickness of the transparent base material 13. It is therefore possible to reduce the distance and obtain an electrophoretic display device capable of performing multicolor display with a little change in tint even in the case of observation from an oblique direction.

If the thickness of the transparent base material 13 exceeds 100 µm, no sufficient effect of the present invention can be obtained. On the other hand, if the thickness of the transparent base material 13 is smaller than 10 µm, the workability becomes poor because, for example, the transparent base material 13 largely deforms due to expansion/contraction upon forming the electrophoretic display layer 11 and the receptor layer 14 above the transparent base material 13. In addition, the displayed image may readily be uneven due to the deformation of the transparent base material 13.

The electrophoretic display device manufacturing method and the electrophoretic display device according to the above-described embodiment will be described below in more detail.

As the transparent base material 13 used in the electrophoretic display device according to the embodiment of the present invention, a plastic film of polyethylene terephthalate (PET), polycarbonate, polyimide, polyethylene naphthalate, polyether sulphone, an acrylic resin, polyvinyl chloride, or the like, or glass or the like is usable.

The transparent electrode layer 12 is formed above the transparent base material 13. As the transparent electrode forming material, a transparent conductive 15 oxide, for example, an indium oxide-based material such as ITO, a tin oxide-based material, a zinc oxide-based material, a carbon nanotube, or a thiophene-based compound is usable. To form the transparent electrode layer 12, a conventional technique such as a dry deposition method, for example, vapor deposition, sputtering, or CVD or a wet deposition method using a coating solution is usable.

The electrophoretic display layer 11 in which the microcapsules are fixed by a binder resin is formed above the transparent electrode layer 12. The electrophoretic display layer 11 is formed by applying an electrophoretic display layer forming coating solution containing microcapsules encapsulating a dispersion formed by dispersing electrophoretic particles in a dispersion medium, a binder resin, and a solvent onto the transparent base material 13 including the transparent electrode layer 12.

Each microcapsule used to form the electrophoretic display layer 11 has a structure in which at least two kinds of particles having different electrical polarities are dispersed in a transparent dispersion medium in a microcapsule shell.

Examples of the two kinds of particles having different electrical polarities and encapsulated in a microcapsule are black particles and white particles. Microcapsules manufactured by screening, gravity separation, or the like and having an average grain size of 30 to 100 µm are preferably used. The ratio of microcapsules having a grain size of about 10 µm with respect to the average grain size of the microcapsules preferably exceeds at least 50%.

As the microcapsule dispersion, a water-based solvent such as alcohol is used. Water is used unless there is a particular problem. As the transparent dispersion medium, for example, a solvent in which an aliphatic hydrocarbon, aromatic hydrocarbon, alicyclic hydrocarbon, halogenated hydrocarbon, various kinds of esters, alcoholic solvent, or any other resin is solely contained or appropriately mixed is used.

For the black particles, an impalpable powder of glass or a resin or a composite thereof is usable as well as an inorganic pigment such as inorganic carbon. On the other hand, as the white particles, a white inorganic pigment such as known titanium oxide, silica, alumina, or zinc oxide, an organic compound such as a vinyl acetate emulsion, or a composite thereof is usable.

Note that the black particles and white particles can be given not only desired surface charges but also an improved dispersion stability in the dispersion medium as needed by treating the particle surfaces using various kinds of surfactants, dispersants, organic and inorganic compounds, metals, and the like.

The dispersion in which the microcapsules are dispersed is encapsulated in microcapsule shells using a known method, for example, phase separation such as mixed coacervation, interfacial polymerization, in-situ method, or fusion distribution cooling, thereby forming the microcapsules. As the microcapsule shells, for example, rubber or gelatin is usable.

As the binder resin contained in the electrophoretic display layer forming coating solution, a dielectric resin such as a polylactic resin, phenol resin, polypropylene resin, or acrylic resin is usable.

The electrophoretic display layer forming coating solution can be applied using a coater such as a screen printer, micro gravure coater, kiss coater, comma coater, die coater, bar coater, or curtain coater. After the electrophoretic display layer forming coating solution is applied, the coating solution above the transparent electrode layer is dried. As the drying method, heating, air blow, or the like is usable.

In the electrophoretic display device manufacturing method according to the embodiment of the present invention, the pixel electrode surface of the substrate 20 including the pixel electrodes 21 and the electrophoretic display surface of the stacked film 10 including the transparent electrode layer 12 and the electrophoretic display layer 11 above the transparent base material 13 are bonded via the adhesive layer 30. At this time, a synthetic resin adhesive such as a urethane resin adhesive or an acrylic resin adhesive is preferably used as the adhesive. In particular, an adhesive using a high-k dielectric resin is preferably used.

The color filter layers 15a, 15b, and 15c are provided above the surface of the transparent base material 13 opposite to the electrophoretic display layer forming surface. The color filter layers 15a, 15b, and 15c are formed by forming the receptor layer 14 and applying a plurality of kinds of inks to the receptor layer 14. Note that the receptor layer 14 may be provided before the stacked film 10 and the substrate 20 are bonded, as shown in FIGS. 1A, 1B, 1C, 1D, and 1E, or after the stacked film 10 and the substrate 20 are bonded, as shown in FIGS. 2A, 2B, 2C, 2D, 2E, and 2F.

Providing the receptor layer 14 before bonding of the stacked film 10 and the substrate 20 is preferable because the receptor layer 14 can be formed by continuous coating using a roll-to-roll method. However, a cover film may be needed to protect the receptor layer 14. On the other hand, providing the receptor layer 14 after bonding of the stacked film 10 and the substrate 20 is preferable because formation of the receptor layer 14 and that of the color filter layers 15a, 15b, and 15c can continuously be performed, and no cover film or the like need be used.

The receptor layer 14 is formed by applying a receptor layer forming coating solution containing a resin onto the transparent base material 13. As the material of the receptor layer 14, a urethane resin, polyester, acrylic resin, vinyl alcohol resin, or the like is usable. The receptor layer 14 can also contain a porous substance such as synthetic silica or alumina to increase the absorbency of the solvent of the ink. When performing single substrate processing, the receptor layer 14 can be formed by screen printing, offset printing, spin coating, or intermittent coating using a die. When performing continuous processing by roll-to-roll, the receptor layer can be formed by a general-purpose coating technique such as die coating, comma coating, curtain coating, or gravure coating. After the receptor layer forming coating solution is applied, the coating solution above the transparent base material 13 is dried. As the drying method, heating, air blow, or the like is usable.

As the inks used to form the color filter layers 15a, 15b, and 15c, inks containing known coloring pigments or coloring dyes are usable. The color filter layers 15a, 15b, and 15c color light on the pixel basis and can use a three-color pattern of red (R), green (G), and blue (B) or a three-color pattern of yellow (Y), magenta (M), and cyan (C). These colors may be combined. Alternatively, another color such as white (W) may also be combined.

Detailed examples of the coloring pigments are as follows. As a red coloring composition used to form the red coloring layer or red pixel, for example, a red pigment such as C.I. Pigment Red 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 246, 254, 255, 264, 272, 279, or the like is usable. A yellow pigment or an orange pigment can be added to the red coloring composition.

As a green coloring composition, for example, a green pigment such as C.I. Pigment Green 7, 10, 36, 37, or the like is usable. The same yellow pigment as in the red coloring composition can be added to the green coloring composition.

As a blue coloring composition, for example, a blue pigment such as C.I. Pigment Blue 15, 15:1, 15:2, 15:3, 15:4, 15:6, 16, 22, 60, 64, 80, or the like, preferably, C.I. Pigment Blue 15:6 is usable. A violet pigment such as C.I. Pigment Violet 1, 19, 23, 27, 29, 30, 32, 37, 40, 42, 50, or the like, preferably, C.I. Pigment Violet 23 can be added to the blue coloring composition.

A black matrix to partition the pixels by black is not formed in the color filter layers 15a, 15b, and 15c included in the electrophoretic display device according to the embodiment of the present invention. No black matrix is formed in the color filter layers of the electrophoretic display device according to the embodiment of the present invention. For this reason, a method of forming the transparent receptor layer 14 at the time of formation of the color filter layers 15a, 15b, and 15c and discharging inks into the transparent receptor layer 14 by inkjet printing to form the color filters is most productive and suitably usable.

As the method of applying inks to the receptor layer 14, screen printing, offset printing, inkjet printing, or the like is usable because inks of different colors need to be applied. In particular, inkjet printing is preferably used to discharge the inks to the receptor layer 14 and form the color filter layers because alignment is easy.

As the substrate 20 including the pixel electrodes 21, a known substrate is usable. The pixel electrodes 21 of the substrate 20 are connected to their switching elements so as to be able to apply positive and negative voltages between the pixel electrodes and the transparent electrode layer 12. The pixel electrodes 21 are connected to a power supply having an active matrix driving circuit arrangement.

As the alignment mark 22 provided above the pixel electrode surface of the substrate 20, a pattern formed using an ink at an end of the pixel electrode surface of the substrate 20 is usable. A dummy pixel electrode pattern may be formed at an end of the pixel electrode surface of the substrate 20 and used as the alignment mark 22. The dummy pattern can also be formed at the same time as the creation of the pixel electrodes. Alternatively, an interconnection pattern or dummy interconnection pattern on the pixel electrode forming surface of the substrate 20 may be used as the alignment mark 22. The alignment mark 22 can have a cruciform, round shape, multiple concentric circular shape, wedge shape, or the like.

As the protective film, the materials exemplified for the transparent base material are usable. A plastic film of polyethylene terephthalate (PET), polycarbonate, polyimide, polyethylene naphthalate, polyether sulphone, an acrylic resin, polyvinyl chloride, or the like, or glass or the like is usable. The protective film may include, on the observer side, a hard coat layer to improve the damage resistance of the surface, an antireflection layer to prevent reflection on the surface, and a thin-film layer containing a metal component considering damp proofing. Note that the receptor layer and the protective film are bonded by a known adhesive.

Examples of the resin of the sealant to seal the ends of the electrode plates sandwiching the microcapsule layer 11 are a polyolefin resin, polyester resin, polyamide resin, polyurethane resin, and polysilicon resin that are thermoplastic resins and an epoxy resin, urethane resin, melamine resin, phenol resin, and acrylic resin that are thermosetting resins.

EXAMPLES

Example 1

A titanium oxide powder (white particles) having a surface coated with a polyethylene resin and an average grain size of 3 μm and a carbon black powder (black particles) having a surface treated by alkyl trimethyl ammonium chloride and an average grain size of 4 μm were dispersed in tetrachloroethylene, thereby obtaining a dispersion. In this case, the white particles are negatively charged, and the black particles are positively charged upon applying an electric field.

This dispersion was converted into an o/w emulsion. Microcapsules were formed by complex coacervation using gelatin-gum arabic, thereby encapsulating the dispersion in the microcapsules.

The thus obtained microcapsules were screened to uniform the grain sizes so that the average grain size became 60 μm, and the ratio of microcapsules having a grain size of 50 to 70 μm became about 50%.

Next, a water dispersion containing the microcapsules at a solid content of 40% by mass was prepared. The water dispersion, a urethane-based binder (CP-7050 available from DIC) having a solid content of 25% by mass, a surfactant, a thickener, and pure water were mixed to prepare an electrophoretic layer forming coating solution.

After that, a polyester-based receptor solution NS-141LX (Takamatsu Oil & Fat) was continuously applied to the PET side of an ITO layer/PET film using a comma coater to form a receptor layer having an average film thickness of 10 μm. As a film to temporarily protect the receptor layer, a polypropylene film-based L-5005 (Hitachi Chemical) was bonded to the receptor layer, thereby obtaining a multilayered film of temporary protective film/receptor layer/PET film/ITO layer.

Then, the microcapsule ink was applied 75 μm in thickness to the ITO layer side of the multilayered film using a die. An Si-release layer film with a urethane-based adhesive was bonded to the surface of the formed microcapsule layer, thereby obtaining a stacked film of temporary protective film/receptor layer/PET film/ITO layer/microcapsule-type electrophoretic display layer/Si-release layer.

The stacked film is drawn from a roll on which the obtained stacked film with the receptor layer was wound and cut using a $CO_2$ laser cutter into a size smaller than the substrate including the pixel electrodes.

On the other hand, a substrate above which pixel electrodes and an alignment mark were formed was prepared. The pixel electrode had an active matrix driving circuit arrangement using a thin-film transistor. The alignment mark was formed at an end of the substrate surface and had a cruciform pattern having a total width of 500 μm and a line width of 200 μm.

Next, the Si-release film of the cut stacked film was peeled off (the adhesive stuck to the microcapsule-type electrophoretic display layer). The stacked film above which the pixel electrodes and the alignment mark were formed was bonded to the peeled surface by laminating, thereby obtaining an electrophoretic microcapsule substrate with the receptor layer.

The temporary protective film on the receptor layer side of the obtained electrophoretic microcapsule substrate with the receptor layer was peeled off. Color printing was performed for the receptor layer by inkjet printing on the pixel basis, thereby forming color filter layers. At this time, alignment was performed using the cruciform pattern for alignment above the substrate. The color filter layers had a red/blue/green pattern.

An adhesive hard coat film KB stick SG90R (Kimoto) was laminated onto the receptor layer as a protective film. An electrophoretic display device was thus manufactured.

When a voltage is applied to each pixel of the obtained electrophoretic display device, color display could be performed. Since the electrophoretic layer and the color filter layers were close to each other, no color unevenness caused by parallax was observed.

Example 2

A titanium oxide powder (white particles) having a particle surface coated with a polyethylene resin and an average grain size of 3 μm and a carbon black powder (black particles) having a surface treated by alkyl trimethyl ammonium chloride and an average grain size of 4 μm were dispersed in tetrachloroethylene, thereby obtaining a dispersion. In this case, the white particles are negatively charged, and the black particles are positively charged upon applying an electric field.

This dispersion was converted into an o/w emulsion. Microcapsules were formed by complex coacervation using gelatin-gum arabic, thereby encapsulating the dispersion in the microcapsules.

The thus obtained microcapsules were screened to uniform the grain sizes so that the average grain size became 60 μm, and the ratio of microcapsules having a grain size of 50 to 70 μm became about 50%.

Next, a water dispersion containing the microcapsules at a solid content of 40% by mass was prepared. The water dispersion, an urethane-based binder (CP-7050 available from DIC) having a solid content of 25% by mass, a surfactant, a thickener, and pure water were mixed to prepare an electrophoretic layer forming coating solution.

The electrophoretic layer forming coating solution was applied onto the ITO layer of a film made of a 100-μm thick ITO layer/PET base material using a slot die coater and after application, dried at 60° C. for 10 min, thereby obtaining a stacked film of microcapsule-type electrophoretic display layer/ITO layer/PET film.

The stacked film is drawn from a roll above which the stacked film was wound and cut using a $CO_2$ laser cutter into a size smaller than the substrate including the pixel electrodes.

On the other hand, a substrate above which pixel electrodes and an alignment mark were formed was prepared. The pixel electrode had an active matrix driving circuit arrangement using a thin-film transistor. The alignment mark was formed at an end of the substrate surface and had a double concentric circular pattern having diameters of 500 μm and 200 μm and a line width of 100 μm.

Next, the cut stacked film was bonded to the pixel electrode surface of the substrate under a pressure of 0.50 MP to prepare an electrophoretic display panel. At this time, the bonding was performed so as not to arrange the stacked film above the pixel alignment pattern on the substrate.

The stacking ends of the stacked film and the pixel electrodes of the obtained electrophoretic display panel were surrounded and sealed by a UV curing sealant KJC-7805 (Shin-Etsu Chemical).

Subsequently, a Daiaroma IJ-2101 (Dainichi Seika Color & Chemicals) serving as an inkjet receptor solution was intermittently applied to the transparent base material to form a receptor layer having a thickness of about 10 μm.

Inks of colors corresponding to the respective pixels were printed to the receptor layer using an inkjet printer based on the alignment pattern at the end of the substrate, thereby forming color filter layers. At this time, alignment was performed using the double concentric circular pattern for alignment on the substrate. The color filter layers had a red/blue/green pattern. An adhesive hard coat film (KB stick SG90R available from Kimoto) was laminated onto the receptor layer as a protective film. An electrophoretic display device was thus manufactured.

When a voltage is applied to each pixel of the obtained electrophoretic display device, color display could be performed. Since the electrophoretic layer and the color filter layers were close to each other, no color unevenness caused by parallax was observed.

What is claimed is:

1. An electrophoretic display device manufacturing method comprising:
preparing a substrate including a pixel electrode;
preparing a stacked film including, above a transparent base material, a transparent electrode layer and an electrophoretic display layer in which microcapsules encapsulating a dispersion formed by dispersing electrophoretic particles in a dispersion medium are fixed by a binder resin, wherein the transparent electrode layer and the electrophoretic display layer are disposed sequentially from the transparent base material;
bonding the substrate and the stacked film so as to join the pixel electrode and the electrophoretic display layer;
forming a receptor layer on the transparent base material surface of the stacked film; and
forming a color filter layer in the receptor layer, the color filter layer having a pixel pattern corresponding to a pattern of the pixel electrode on the transparent base material surface of the stacked film, the forming the color filter layer being performed by discharging ink into portions of the receptor layer by inkjet printing such that the color filter layer is formed from the portions of the receptor layer absorbing the discharged ink, wherein
the substrate has a region where the electrophoretic display layer is not arranged when the substrate and the stacked film are bonded, a pixel alignment pattern is drawn in the region, and
in the forming the color filter layer, the color filter layer is formed while performing alignment using the pixel alignment pattern.

2. The electrophoretic display device manufacturing method according to claim 1, wherein in the preparing the stacked film, the receptor layer is formed above the base material surface of the stacked film.

3. The electrophoretic display device manufacturing method according to claim 1, further comprising forming the receptor layer above the base material surface of the stacked film after the bonding the substrate and the stacked film.

4. The electrophoretic display device manufacturing method according to claim 1, wherein the bonding the substrate and the stacked film is performed using an adhesive by applying a pressure.

5. The electrophoretic display device manufacturing method according to claim 1, further comprising stacking a protective film above the color filter layer after forming the color filter layer.

6. The electrophoretic display device manufacturing method according to claim 1, further comprising sealing a joint end between the pixel electrode and the electrophoretic display layer by a resin after forming the color filter layer.

7. The electrophoretic display device manufacturing method according to claim 1, wherein a thickness of the transparent base material falls within a range of 10 μm (inclusive) to 100 μm (inclusive).

8. An electrophoretic display device comprising:
a substrate;
a pixel electrode formed above the substrate;
an electrophoretic display layer arranged above the pixel electrode and formed by fixing, by a binder resin, microcapsules encapsulating a dispersion formed by dispersing electro-migrating particles in a dispersion medium;
a transparent electrode layer provided above the electrophoretic display layer;
a transparent base material provided above the transparent electrode layer;
a receptor layer formed above the transparent base material; and
a color filter layer formed in the receptor layer, the color filter layer being on the transparent base material and comprised of portions of the receptor layer colored by ink absorbed by and fixed in the portions of the receptor layer,
wherein the substrate has a region where the electrophoretic display layer is not arranged, and a pixel alignment pattern is drawn in the region.

9. The electrophoretic display device according to claim 8, further comprising a protective film above the color filter layer.

10. The electrophoretic display device according to claim 8, wherein a joint end between the pixel electrode and the electrophoretic display layer is sealed by a resin.

11. The electrophoretic display device according to claim 8, wherein a thickness of the transparent base material falls within a range of 10 μm (inclusive) to 100 μm (inclusive).

12. The electrophoretic display device according to claim 8, wherein
the color filter layer includes colored pixel regions having a color combination selected from red, green, and blue, and yellow, magenta, and cyan, and
the colored pixel regions includes respectively colored ink fixed in the receptor layer.

13. The electrophoretic display device according to claim 12, wherein no black matrix is formed in, or partitioning pixels of, the color filter layer.

* * * * *